(12) United States Patent
Ryu et al.

(10) Patent No.: US 6,330,384 B1
(45) Date of Patent: Dec. 11, 2001

(54) HIGH-POWER AND WIDE-BAND FIBER OPTIC LIGHT SOURCE

(75) Inventors: Uh-Chan Ryu; Nam-Kyoo Park, both of Seoul; Ju-Han Lee, Kyonggi-do, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/396,270

(22) Filed: Sep. 15, 1999

(30) Foreign Application Priority Data

Sep. 17, 1998 (KR) .................................................. 98-38370

(51) Int. Cl.⁷ ...................................................... G02B 6/26
(52) U.S. Cl. .............................. 385/39; 385/42; 359/177; 372/6
(58) Field of Search ................................. 372/6; 359/341, 359/177, 160; 385/39, 42

(56) References Cited

U.S. PATENT DOCUMENTS 5,633,964 * 5/1997 DiGiovanni et al. .................. 385/27
5,903,385 * 5/1999 Sugaya et al. ........................ 359/341
6,151,338 * 11/2000 Grubb et al. ............................. 272/6

* cited by examiner

*Primary Examiner*—Georgia Epps
*Assistant Examiner*—Tim Thompson
(74) *Attorney, Agent, or Firm*—Steve Cha; Klauber & Jackson (57) ABSTRACT

A high-power and wide-band fiber optic light source including a first rare-earth-doped optical fiber, a second rare-earth-doped optical fiber, an optical coupler coupled between the first and second rare-earth-doped optical fiber for transmitting the input pumping light to the second rare-earth-doped optical fiber, and a pumping light source adapted to supply pumping light, as the input pumping light, to the optical coupler.

17 Claims, 7 Drawing Sheets

HIGH-POWER AND WIDE-BAND FIBER OPTIC LIGHT SOURCE

CLAIM OF PRIORITY

This application makes reference to, incorporates the same herein, and claims all benefits accruing under 35 U.S.C. §119 arising from an application entitled, HIGH POWER AND WIDE-BAND FIBER OPTIC LIGHT SOURCE, earlier filed in the Korean Industrial Property Office on Sep. 17, 1998, and there duly assigned Ser. No. 1998-38370.

BACKGROUND OF THE INVENTION

1. Field of the Invention

The present invention relates to a fiber optic light source, and more particularly to a high-power and wide-band fiber optic light source adapted to use amplified spontaneous emission (ASE) light as a secondary pumping source.

2. Description of the Related Art

A continued research is being conducted for wide-band light sources, and as a result, they have a variety of applications to be used as gyrosensors, light sources for testing the optical elements, and light sources of sliced spectrums to provide inexpensive access networks.

In particular, the light sources which use ASE light emitted from a fiber doped with a rare-earth elements such as erbium are well known as being an excellent wide-band light source in that they exhibit wide spectrum, high power, and low loss characteristics. All research efforts, which have been made for such erbium-doped fiber (EDF) wide-band light sources, are associated with a wavelength band of 1,520 to 1,560 nm in the range that most optical communication elements and conventional EDF amplifiers operate.

However, a recent demand for the expansion of optical communication resulted in more active developments of optical amplifiers operating in long-wavelength bands. In this regard, it has also been necessary to develop light sources having high efficiency, high-power and wide-band spectrums operating in long-wavelength bands.

Figure 1:
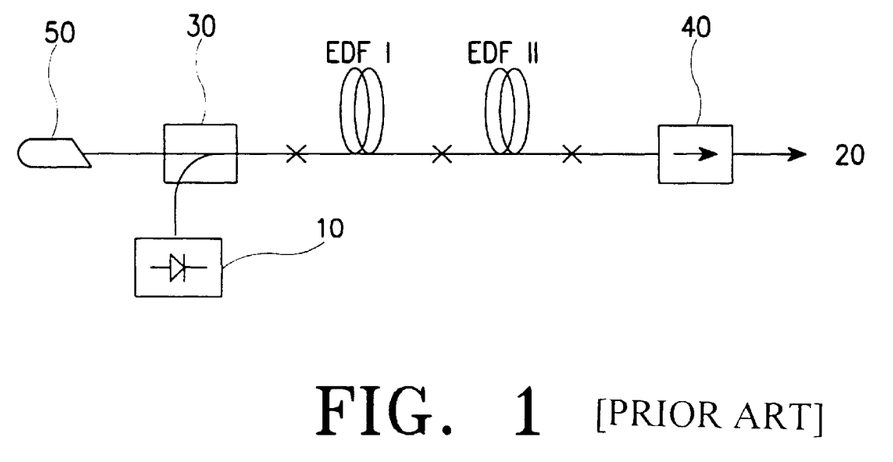
FIG. 1 is a schematic view illustrating a conventional EDF light source.

FIG. 1 is a schematic view illustrating a conventional EDF light source. Referring to FIG. 1, a light beam, which are generated while passing through the EDF regions, EDF I and EDF II, and is pumped by a forward pumping light means, and then emitted as an output light 20.

The forward pumping light means comprises a laser diode 10 having an operating wavelength of 980 nm. The laser diode 10 is coupled to the EDF light source by means of a wavelength division multiplexing (WDM) coupler 30. In the illustrated case, an optical isolator 40 is also arranged at the output terminal of the EDF light source in order to guide the travel direction of the light in one direction. However, the EDF light source depicted in FIG. 1 produces undesirable low intensity of output light and narrow operating wavelength band.

Figure 2:
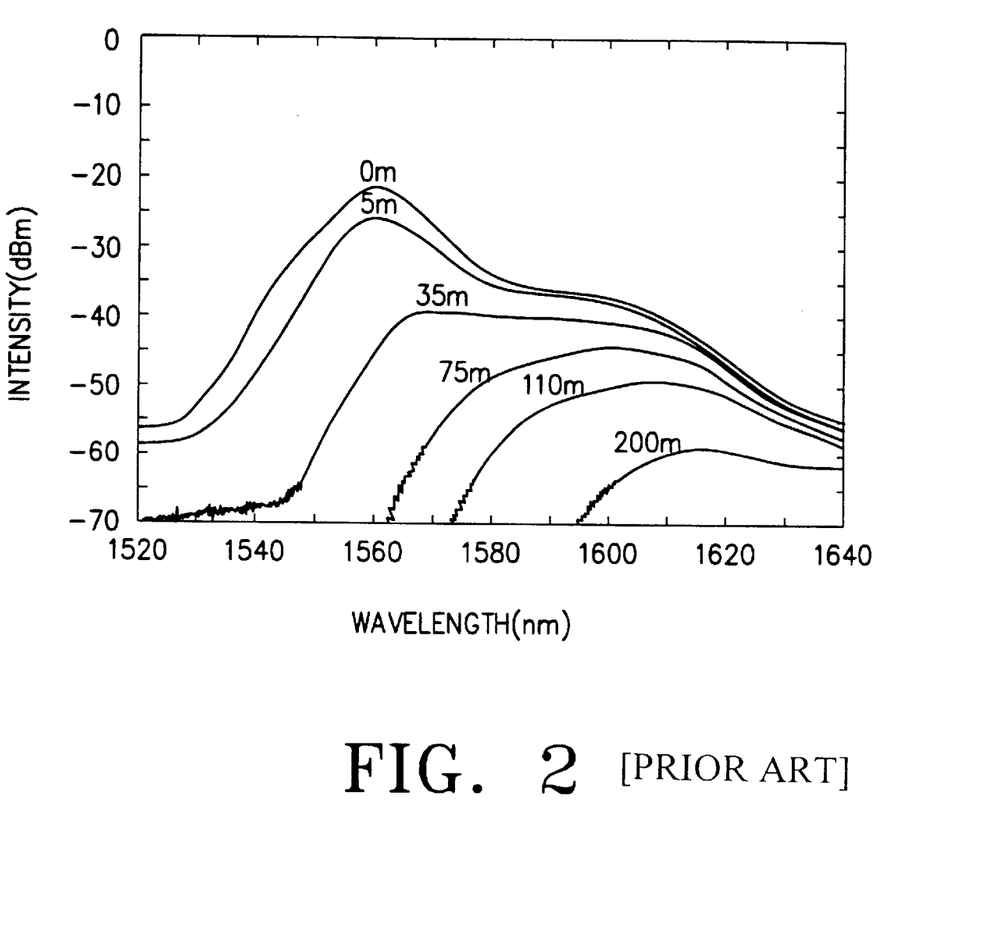
FIG. 2 is a graph depicting ASE output spectrums of conventional EDF light sources which have the configuration of FIG. 1 while varying the length of a second erbium-doped optical fiber, EDF II.

FIG. 2 is a graph depicting ASE output spectrums of conventional EDF light sources which have the above mentioned configuration while operating the optical fibers for EDF II at different lengths, accordingly. Referring to FIG. 2, it can be found that the intensity and emission bandwidth of the ASE light outputted in the above mentioned configuration decrease depending on the length of the second erbium-doped fiber (EDF) region, namely, EDF II.

SUMMARY OF THE INVENTION

Therefore, one of the objects of the present invention is to provide a fiber optic light source exhibiting high power along with a high pumping efficiency.

Another object of the present invention is to provide a fiber optic light source operating at a wide band of long wavelengths.

In accordance with the present invention, these objects can be accomplished by providing a fiber optic light source comprising: a pumping light source for outputting pumping light; a first optical fiber portion adapted to be optically pumped by the pumping light from the pumping light source; an optical coupler coupled between the pumping light source and the first optical fiber portion and adapted to transmit the pumping light from the pumping light source to the first optical fiber portion, and a second optical fiber portion coupled to an input end of the first optical fiber portion, at which the first optical fiber portion is coupled to the optical coupler, the second optical fiber portion being adapted not to be optically pumped by the pumping light from the pumping light source, but to use a backward amplified spontaneous emission light emitted from the first optical fiber portion as a secondary pumping source thereof.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 3:
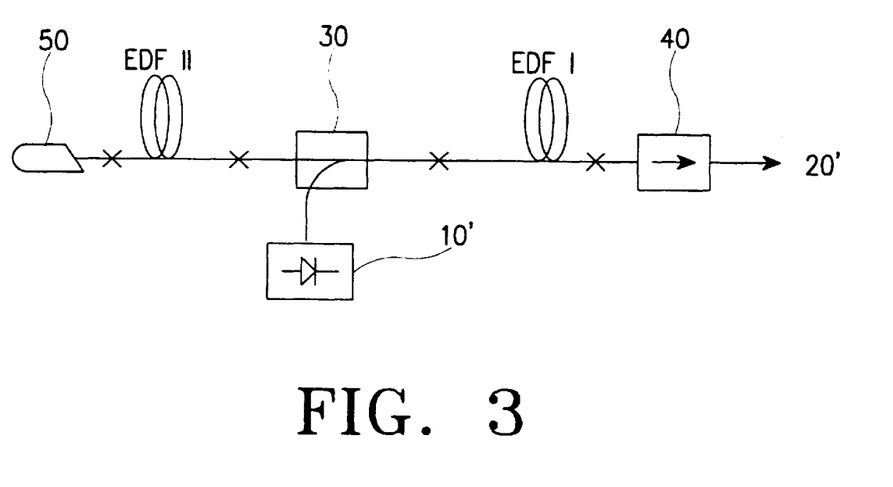
FIG. 3 is a schematic view illustrating a wide-band rare-earth-doped fiber optic light source in accordance with an embodiment of the present invention.

FIG. 3 is a schematic view illustrating a wide-band rare-earth-doped fiber optic light source in accordance with an embodiment of the present invention. As shown in FIG. 3, the wide-band light source includes a first optical fiber, EDF I, which is comprised of a rare-earth-doped optical fiber adapted to be optically pumped by the pumping light outputted from a pumping light source 10'. The light source also includes a second optical fiber, EDF II, which is comprised of a rare-earth-doped optical fiber, but it is not provided with the pumping light outputted from the pumping light source 10'. An optical coupler 30 is coupled between the pumping light source 10' and the input end of the first optical fiber portion, EDF II. For the pumping light source 10', a laser diode is used. The optical coupler 30 serves to transmit the pumping light from the pumping light source 10' to the input end of the first optical fiber portion, EDF I. The wide-band light source of the present invention also has a configuration for using a backward amplified spontaneous emission (ASE) light outputted from the first optical fiber, EDF I, as a secondary pumping source for the second optical fiber, EDF-II. In accordance with the illustrated embodiment of the present invention, this configuration is implemented by coupling the output end of the second optical fiber, EDF II, to an input end of the first optical fiber portion, EDF 1, via the optical coupler 30. That is, the optical coupler 30 is provided between the EDF I and EDF II in such a fashion that backward ASE light emitted from the first optical fiber portion, EDF I, is used as a secondary pumping source in the second optical fiber, EDF II.

In order to avoid an undesirable oscillation effect, the second optical fiber, EDF II, has an angled cleaving-processed input end 50. Also, an optical isolator 40 is coupled to the output end of the first optical fiber, EDF 1. Furthermore, in place of the angled cleaving-processed input end 50, an optical isolator may be coupled to the input end of the second optical fiber, EDF II, as occasion demands.

After comparing the configuration of the illustrated embodiment of the present invention, as shown in FIG. 3, with the conventional configuration, as shown FIG. 1, it can be distinguishable that they are different in terms of the arrangement of the second optical fiber, EDF II, while using the same total optical fiber length. The remarkable difference of the configuration shown in FIG. 3 from that shown in FIG. 1 is that the second optical fiber, EDF II, according to the present invention is arranged upstream from the laser diode 10', so that no pumping light passes through the second optical fiber, EDF II.

In order to measure the spectrums of the wide-band light source according to the embodiment of the present invention, a spectrum measurement test was conducted after equally configuring all elements of the wide-band light source including the first and second optical fibers, EDF I and EDF II, in such a fashion that they have the same configurations as those of the conventional light source, except for the characterized configuration of the present invention associated with the re-usage of a reverse ASE light.

The first and second optical fibers, EDF I and EDF II, used in the test were conducted using an erbium-doped silica optical fiber co-doped with aluminum so that they exhibit a maximum absorption coefficient of 4.5 dB/m at a wavelength of 1,530 nm. The first optical fiber, EDF 1, had a fixed length of 135 m. The pumping power of the 980 nm laser diode, which was used as a pumping light source, was set to 60 mW.

In order to observe the dependency of the intensity of output light on the length of the rare-earth-doped optical fiber region not pumped, that is, the length of the second optical fiber, EDF II, the test was conducted while varying the length of the second optical fiber, EDF II, at 0 m, 5 m, 35 m, 75 m, 110 m, and 200 m, respectively. In the present invention, no wide-band light source using a reverse/back pumping configuration is taken into consideration because the spontaneous emission of light in such a configuration occurs mainly in short wavelength bands.

Figure 4:
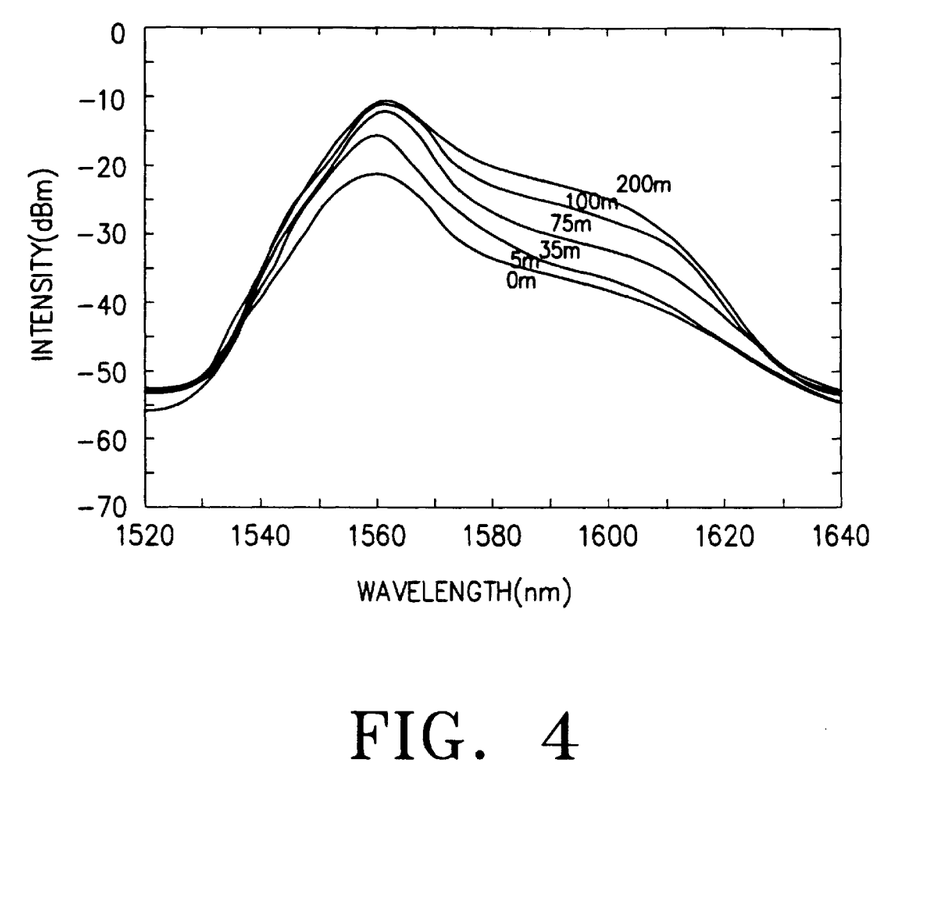
FIG. 4 is a graph depicting ASE output spectrums of the wide-band rare-earth-doped fiber optic light source according to the embodiment of the present invention, depending on various lengths of the second optical fiber thereof, respectively.

FIG. 4 is a graph depicting ASE output spectrums of the wide-band rare-earth-doped fiber optic light source according to the illustrated embodiment of the present invention at various lengths of the second optical fiber thereof, respectively. Referring to FIG. 4, it can be found that the wide-band light source of the present invention not only exhibits an increase in the intensity of the ASE output, but also an extended emission bandwidth, as the length of the second optical fiber, EDF II, is increased.

Such an improvement in the output power results from the provision of the light re-use configuration, according to the present invention, which allows useless backward ASE light from EDF I traveling in a direction reverse to that of pumping light to be re-used as a 1,550 nm pumping source in EDF II, thereby generating photons, serving as seeds at a downstream amplifying stage, at the longer wavelength bands of 1,600 nm. Referring to the results of the test depicted in FIG. 4, it can be found that the overall integrated output power is 6.7 mW when the length of the second optical fiber, EDF II, not pumped, is 200 m. This value exhibits an increase by 10 dB or more, as compared to that of the conventional wide-band light source.

In order to find an optimum length of the second optical fiber, EDF II, not pumped, the same observation as mentioned above was made while varying the length of the second optical fiber, EDF II, to 235 m and 270 m, respectively. However, any remarkable variation in the output power was not observed. Based on such results of the test, it can be found that it is effective to set the length of the second optical fiber, EDF II, not pumped, to about 200 m. Of course, this length of the second optical fiber, EDF II, may not be an optimum one for some cases because the optimum length of the second optical fiber, EDF II, depends on various design parameters of the light source such as the wave length and pumping power of pumping light, as well as the characteristic parameters of erbium fiber used to build the ASE source.

Figure 5:
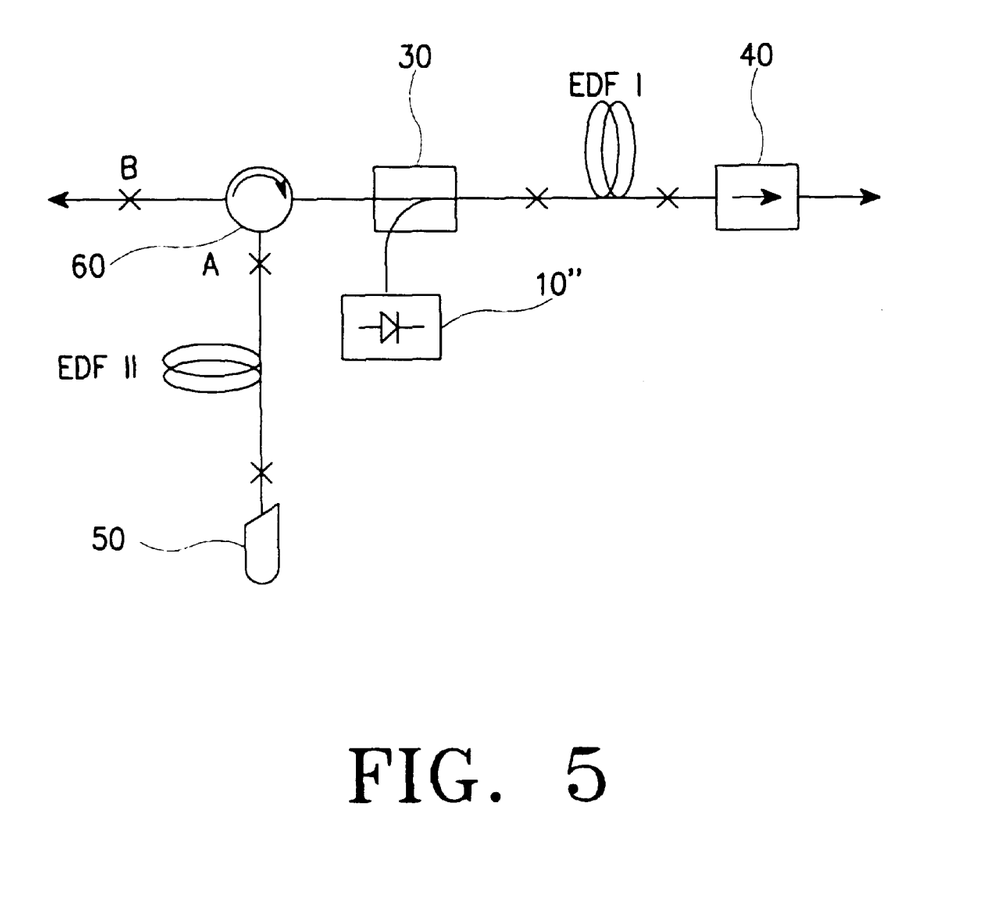
FIG. 5 is a schematic view illustrating a device for identifying the presence of a sufficient reverse ASE to achieve a great improvement in output power.
Figure 6:
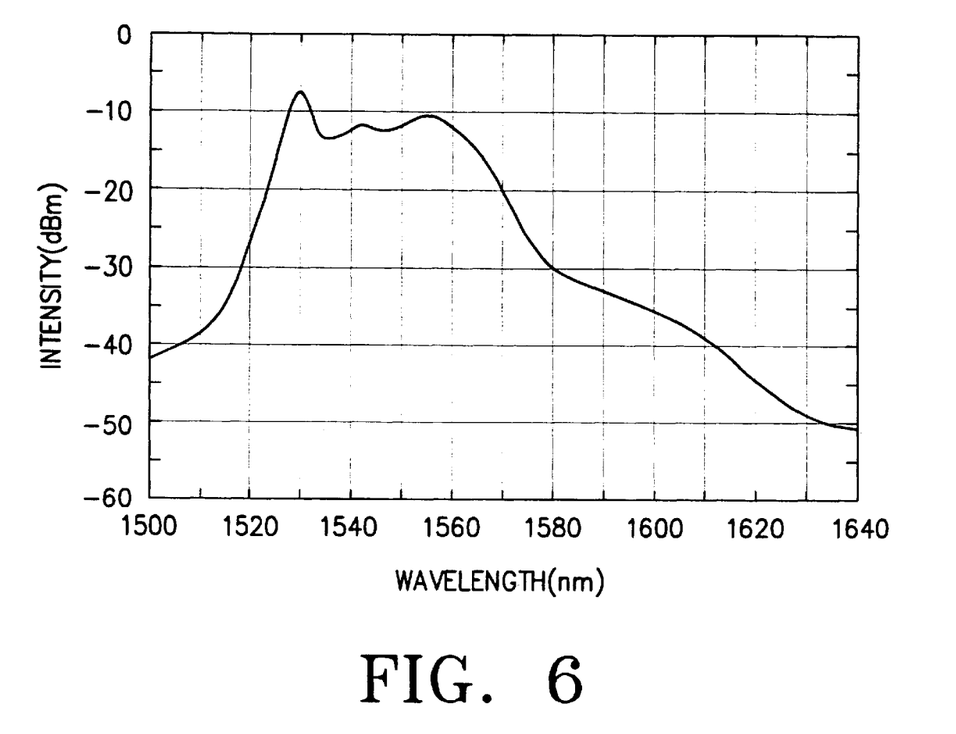
FIG. 6 is a graph depicting the spectrum of backward ASE light, emerging from a first optical rare-earth-doped fiber included in the fiber optic light source of FIG. 3, measured at a point A in FIG. 5; and, FIG. 7 is a graph depicting the spectrum of a forward ASE light generated from EDF II with the secondary pumping effects from backward ASE light of EDFI and measured at a point B in FIG. 5.
Figure 7:
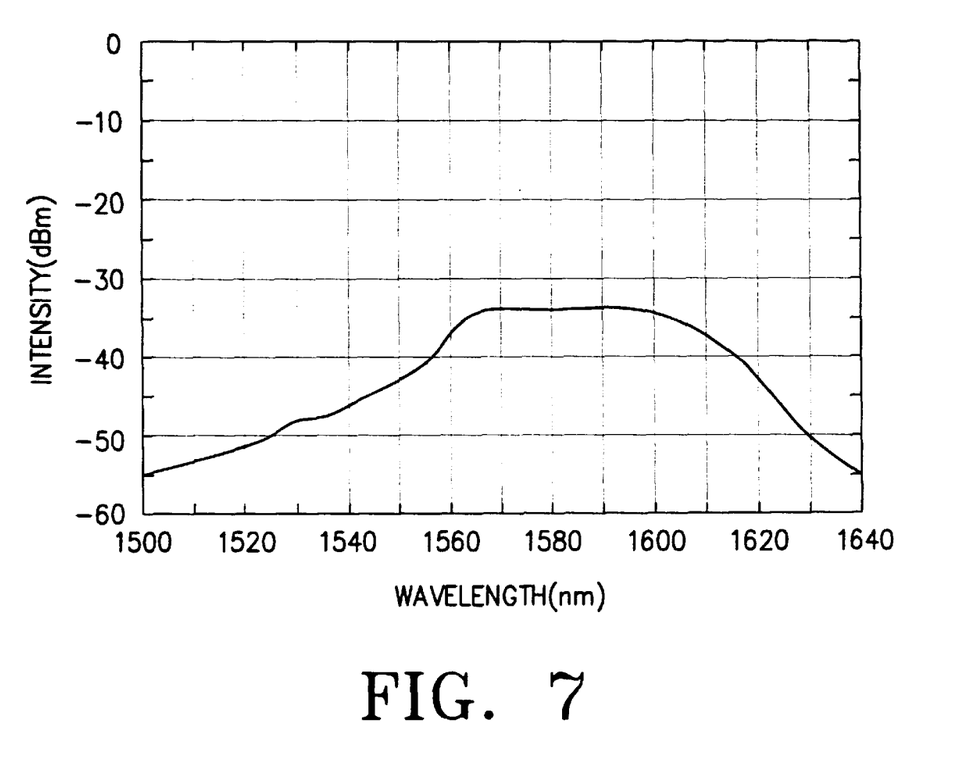

FIG. 5 is a schematic view illustrating a testing device for identifying the presence of a sufficient reverse ASE to achieve a great improvement in the output power. FIG. 6 is a graph depicting a reverse ASE spectrum, emerging from the first optical rare-earth-doped fiber, measured at a point A in FIG. 5. FIG. 7 is a graph depicting a forward ASE spectrum measured at a point B in FIG. 5.

The measurement of the reverse ASE light outputted from the wide-band light source according to the present invention was made by incorporating an identification device with a circulator 60, as shown in FIG. 5. The identification device is adapted to identify pumping effects obtained by the reverse ASE light traveling from the first rare-earth-doped optical fiber, EDF I, to the second rare-earth-doped optical fiber, EDF II.

Referring to FIG. 6, it can be found that output power exhibiting an intensity of −30 dBm or more is obtained in a wavelength band of about 60 nm ranging from 1,520 nm to 1,580 nm. The overall output power of the reverse ASE light was 19.9 mW after a normalization of a 1 dB insertion loss caused by the use of the circulator 60. This value corresponds to about 33.2% of the overall pumping power exhibited at 980 nm. This measurement was conducted using a 0.2 nm resolution bandwidth.

By comparing FIG. 6 and FIG. 7, it can be found that photons are generated in a wavelength band ranging from 1,540 nm to 1,620 nm in an amount enough to allow those photons to serve as photon seeds for an amplification at the rare-earth-doped optical fiber region being forwardly pumped. That is, it can be found that the second rare-earth-doped optical fiber, EDF II, not pumped, which is arranged upstream from the pumping laser diode, serves as a photon seed generator for the first rare-earth-doped optical fiber, EDF I, which is a downstream amplification stage.

In accordance with the present invention, it is possible to provide a high-power and wide-band light source operating in a wavelength band ranging from 1,540 nm to 1,620 nm, as apparent from the above description. That is, in accordance the present invention, the useless reverse ASE light is converted at the optical fiber region, not pumped, into photon seeds for the forward amplification stage, thereby enabling a high-power operation of the wide-band fiber optic light source.

An increase in the intensity of the output ASE light by 10 dB or more was also observed in the overall emission band. In this regard, an improved efficiency of the high-power and wide-band fiber optic light source according to the present invention is also expected with respect to pumping wavelengths other than that mentioned above. Reverse ASE light in a short-wavelength band may also be re-used as a secondary pumping source. In this case, an improvement in pumping efficiency is expected for 1.58 $\mu$m EDF amplifiers.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A fiber optic light source comprising:
   a pumping light source for outputting pumping light;
   a first optical fiber portion having an input end and an output end and being optically pumped by the pumping light from said pumping light source;
   an optical coupler coupled between said pumping light source and the input end of said first optical fiber portion for providing the pumping light from said pumping light source to said first optical fiber portion; and,
   a second optical fiber portion coupled to the input end of said first optical fiber portion via said optical coupler, said second optical fiber portion being adapted not to be optically pumped by the pumping light from said pumping light source, wherein said second optical fiber uses a backward amplified spontaneous emission light emitted from said first optical fiber portion as a secondary pumping source thereof.

2. The fiber optic light source in accordance with claim 1, wherein each of said first and second optical fiber portions is comprised of a rare-earth-doped optical fiber.

3. The fiber optic light source in accordance with claim 2, wherein said rare-earth-doped optical fiber is an erbium-doped optical fiber.

4. The fiber optic light source in accordance with claim 1, further comprising:
   means for avoiding undesirable oscillation effects from being generated in said fiber optic light source, wherein said means is located at the input end of said second optical fiber portion opposite to said first optical fiber portion.

5. The fiber optic light source in accordance with claim 4, wherein said means for avoiding undesirable oscillation effects includes an angled cleaving-processed input end.

6. The fiber optic light source in accordance with claim 1, wherein the pumping light source comprises a laser diode.

7. The fiber optic light source in accordance with claim 1, further comprising:
   an optical isolator coupled to the output end of said first optical fiber portion for guiding the pumping light along said second optical fiber portion to travel in one direction.

8. A fiber optic light source comprising:
   a pumping light source for outputting pumping light; a first optical fiber portion having an input end and an output end and being optically pumped by the pumping light from said pumping light source;
   an optical coupler coupled between said pumping light source and the input end of said first optical fiber portion for providing the pumping light from said pumping light source to said first optical fiber portion;
   a second optical fiber portion coupled to the input end of said first optical fiber portion via said optical coupler, said second optical fiber portion being adapted not to be optically pumped by the pumping light from said pumping light source, wherein said second optical fiber uses an amplified spontaneous emission light emitted from said first optical fiber portion as a secondary pumping source thereof;
   an optical isolator coupled to the output end of said first optical fiber portion for guiding the pumping light along said second optical fiber portion to travel in one direction; and,
   means for avoiding undesirable oscillation effects from being generated in said fiber optic light source, wherein said means is located at the input end of said second optical fiber portion opposite to said first optical fiber portion.

9. The fiber optic light source in accordance with claim 8, wherein each of said first and second optical fiber portions is comprised of a rare-earth-doped optical fiber.

10. The fiber optic light source in accordance with claim 9, wherein said rare-earth-doped optical fiber is an erbium-doped optical fiber.

11. The fiber optic light source in accordance with claim 8, wherein said means for avoiding undesirable oscillation effects includes an angled cleaving-processed input end.

12. The fiber optic light source in accordance with claim 8, wherein the pumping light source comprises a laser diode.

13. A fiber optic light source comprising:
   a pumping light source for outputting pumping light;
   a first optical fiber portion having an input end and an output end and being optically pumped by the pumping light from said pumping light source;
   an optical coupler coupled between said pumping light source and the input end of said first optical fiber portion for providing the pumping light from said pumping light source to said first optical fiber portion;
   a second optical fiber portion coupled to the input end of said first optical fiber portion via said optical coupler, said second optical fiber portion being adapted not to be optically pumped by the pumping light from said pumping light source, wherein said second optical fiber uses an amplified spontaneous emission light emitted from said first optical fiber portion as a secondary pumping source thereof;
   an optical isolator coupled to the output end of said first optical fiber portion for guiding the pumping light along said second optical fiber portion to travel in one direction; and,
   means for avoiding undesirable oscillation effects from being generated in said fiber optic light source, wherein said means is located at the input end of said second optical fiber portion opposite to said first optical fiber portion.

14. The fiber optic light source in accordance with claim 13, wherein each of said first and second optical fiber portions is comprised of a rare-earth-doped optical fiber.

15. The fiber optic light source in accordance with claim 14, wherein said rare-earth-doped optical fiber is an erbium-doped optical fiber.

16. The fiber optic light source in accordance with claim 13, wherein said means for avoiding undesirable oscillation effects includes an angled cleaving-processed input end.

17. The fiber optic light source in accordance with claim 13, wherein the pumping light source comprises a laser diode.

* * * * *